July 15, 1969 A. A. KWARTIROFF ET AL 3,456,206

CABLE EQUALIZER

Filed Oct. 21, 1965

INVENTORS
ALEXIS A. KWARTIROFF
MICHAEL F. TCHINNIS

BY Beale and Jones
ATTORNEYS

United States Patent Office 3,456,206

Patented July 15, 1969

3,456,206
CABLE EQUALIZER

Alexis A. Kwartiroff, Sea Cliff, and Michael F. Tchinnis, Amityville, N.Y., assignors, by mesne assignments, to Giannini Scientific Corporation, Amityville, N.Y., a corporation of Delaware Filed Oct. 21, 1965, Ser. No. 499,338
Int. Cl. H03f *3/04*
U.S. Cl. 330—32 10 Claims

ABSTRACT OF THE DISCLOSURE

A solid state active equalizer for wideband transmission lines of varying lengths comprising an emitter follower transistor combined with frequency compensating and impedance matching networks. The line input is applied to the base of a transistor connected in emitter-follower configuration. The transistor emitter is connected through an impedance matching network and a first frequency compensating network to ground. The impedance matching network is further coupled to a second frequency compensating network, the output of which leads to the transmission line output.

Figure 1:
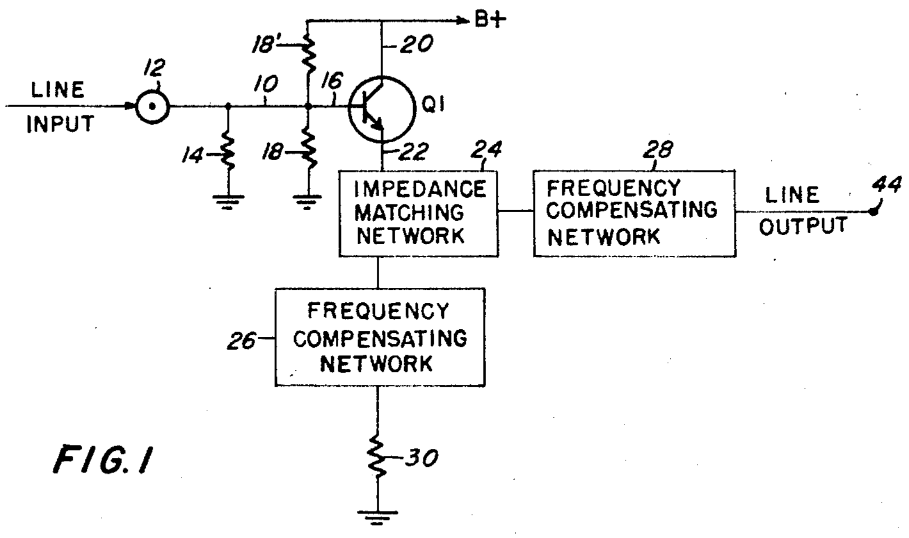

The present invention relates to electronic equalization of transmission lines and, more particularly, to equalization systems which are capable of compensating for losses occurring during transmission of high frequency signals, such as television signals, over transmission lines or cables of various lengths.

In the transmission of complex waveform signals, and particularly of signals having high frequency components, distortion of the signal is caused by undesirably high attenuation which occurs in presently known transmission lines due to the large impedances presented to the higher frequency signals. The degree of attenuation of such signals is dependent on the frequencies being carried in the cable since the losses usually are due to capacitive and inductive effects. Additional losses in the signals result from manufacturing variations in the cables and from reflection and interaction losses due to the impedance terminations of the cables. Since the attenuation in such cable transmission systems is frequency dependent, it becomes necessary to provide compensation means for the particular frequencies which are being attenuated. Such compensation is normally provided by equalizer networks specially designed for each of the various transmission lines, and leads to the use of complex networks containing large numbers of circuit elements for relatively short cable lengths. With any equipment such as television cameras which may have to operate at different times with different lengths of cables, an even larger number of equalizing networks has to be provided in order to allow selection by switching of the equalization appropriate to the length of cable in use in order to produce a video output signal which is properly compensated for losses. Since a coaxial cable causes an attenuation of the higher frequency components without introducing any phase shift in these components, it is necessary to provide an equalization network which does not introduce phase shift into the operation.

Prior art equalization networks utilize wide band, high gain amplifiers which are compensated by passive or active networks effectively to reduce the gain at low frequencies while maintaining the gain at high frequencies. The use of such amplifiers, while providing the necessary band width and gain, introduces excessive system noise while giving only marginally acceptable differential gain and phase characteristics. These latter two characteristics, which determine the equalizer linearity, are extremely important for high resolution video systems and color video transmission. The effects of these parameters on video system performance are well known in the art and are more than adequately described in the literature. Special line termination networks exist which have been used to reduce the system noise introduced by existing equalizers but careful and tedious design of the equalizers is required to permit video system performance within acceptable gain and phase characteristics. However, the use of these special networks merely serves to further complicate an already complex system.

According to the present invention, there is provided a completely electronic, solid state, active equalizer which is physically compact and suitable for employment in video cable transmission systems. Further, the equalizer permits correction to be made for the loss characteristics of transmission systems having a variety of incremental lengths of cable, permitting the necessary corrections to be made while introducing an amount of system noise which is less than or equal to the lowest value attainable with the present state-of-the-art combinations of line termination networks and equalizers. Differential phase and gain characteristics which are several orders of magnitude better than those available with any presently known equalizer or equalizer system are also obtained with the present circuitry.

More particularly, the cable equalizer of this invention utilizes a circuit in which the performance of an emitter follower is combined with the frequency compensated response of an impedance transfer network or device to provide a low noise figure and to provide the excellent differential phase and gain characteristics inherent in an emitter follower.

It is, therefore, an object of this invention to provide an equalizer network which is relatively simple in circuit arrangement and which provides increased reliability and operating life.

Another object of this invention is to provide means for equalizing different lengths of transmission cable without requiring that a plurality of stages be cascaded.

An additional object of the invention is to provide an equalizer which does not present the problems of reflection and interaction losses due to differences between amplifier and equalizer such as are normally encountered.

An additional object of the invention is to provide an equalizer system utilizing a combination of networks which are adapted for use with varying incremental lengths of transmission cable without the use of variable elements which require adjustment with each change of length of cable and which are capable of providing equalization with an equalizer noise figure which is less than that available from the best cable termination network-equalizer combination presently available.

An additional object of the invention is to provide an equalization system having a frequency-compensated impedance matching network connected in such a way in the emitter circuit of an emitter-follower transistor as to provide the desired degree of equalization without introducing undesirable differential phase and gain characteristics but which produces characteristics which are considerably better than those obtainable with the prior state of the art devices.

Figure 2:
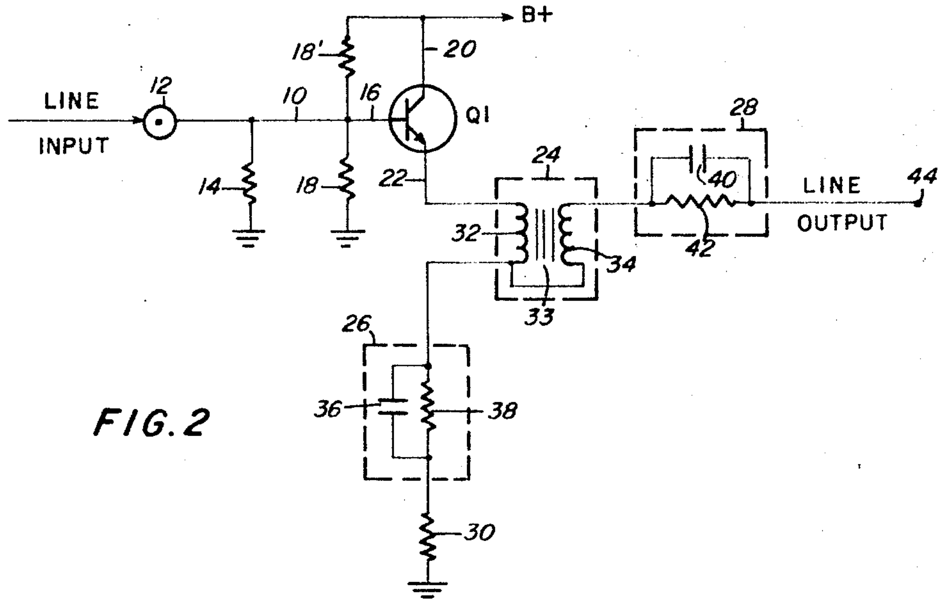

Further objects and advantages of the invention will be appreciated from the following detailed description of one embodiment of the invention, selected for purposes of illustration and shown in the accompanying drawings, in which:

FIG. 1 is a block diagram of a cable equalizer constructed in accordance with the present invention; and FIG. 2 is a schematic diagram of one embodiment of such a system.

Referring now to the block diagram of FIG. 1 a high-frequency, complex wave input signal such as a television signal, which has been transmitted along a cable and has been attenuated thereby, is applied to the input lead 10 of the equalizer system of the invention. This input signal may be from any suitable source as, for example, a coaxial transmission line 12, and is applied across a resistor 14, the impedance of which is matched to the impedance of the signal transmission cable 12 to reduce reflection and interaction losses. The signal passes through line 10 to the base electrode 16 of an active element such as the emitter-follower transistor Q1. A coupling capacitor (not shown) may be inserted in the input line 10 if frequency response to direct current is not required. The emitter electrode 22 of transistor Q1 is connected through an impedance matching network 24, a frequency compensating network 26 and a resistor 30 to ground. The cascade interconnection of the networks 24 and 26 with resistor 30 forms the low impedance emitter-follower load required for low noise figure and differential phase and gain operation. The desired equalization is obtained by the combined amplitude vs. frequency characteristics of the impedance matching network 24 and the frequency compensation network 26. Additional frequency compensation, if desired, can be added by inclusion of a second frequency compensation network 28. The impedance matching network can be any active or passive matching network while the frequency compensating networks can be any active or passive network having the desired frequency characteristics. The impedance matching networks have the ability to provide a low impedance in the emitter electrode 22 circuit as well as to match the impedance of the following stages.

Referring now to the detailed embodiment of FIG. 2, wherein the elements of FIG. 1 are indicated by corresponding numbers and the blocks of FIG. 1 are shown by dotted lines, there is shown a preferred embodiment of the invention. As illustrated in this schematic diagram, the active stage is a transistor connected in emitter-follower configuration, and includes a suitable emitter load which provides frequency gain compensation in addition to performing impedance matching functions.

The video input signal is applied through input lead 10 to the base electrode 16 of transistor Q1. Resistors 18 and 18' illustrate one possible configuration for the application of operational bias to the emitter-follower stage. Collector 20 is connected to a supply of positive bias voltage. Emitter electrode 22 is connected through the primary winding 32 of an impedance-matching transformer 33 which may comprise the impedance matching network 24. Frequency compensation network 26 consists, in one embodiment, of the parallel arrangement of a capacitor 36 and a resistor 38 connected between primary winding 32 and resistor 30. The other side of resistor 30 is connected to ground.

The output from transistor Q1 appearing on the secondary winding 34 of impedance matching transformer 33 is fed through the second frequency compensation network 28 which may consist of the parallel arrangement of a capacitor 40 and a resistor 42. The compensated output signal appears on output terminal 44 of the cable equalizer.

The foregoing illustration of a simplified signal equalizer discloses a preferred embodiment of the invention which is adapted for use with a wide variety of transmission lines. The system is capable of providing frequency equalization for a large number of frequencies without the need for variable components, and does not require a large number of equalization circuits with complex switching arrangements for use when the characteristics of the cable change. The extension of the equalizer capability is achieved through the use of an active emitter-follower stage which is properly loaded with low-impedance, frequency-compensated, impedance matching circuitry, and thus avoids the difficulties of other equalizers which utilize cable terminating networks, amplifiers and cascaded passive equalization circuitry. Further, the desired attenuation compensation is provided without introducing appreciable phase shifts or noise. However, the scope of the invention is not limited to the specific embodiment shown but includes the various alternatives and modifications that fall within the true spirit and scope of the invention as defined by the following claims.

We claim:

1. A cable equalizing circuit for compensating for the attenuation characteristics of wideband transmission lines of varying lengths, comprising input and output terminals for connecting said circuit in a transmission line, semiconductor means having input and output electrodes, said input electrode being connected to said input terminal, an impedance matching network connected to said output electrode, a first frequency compensating network connected between said impedance matching network and ground, and a second frequency compensating network connected between said impedance matching network and said output terminal.

2. The cable equalizing circuit of claim 1, further including impedance matching means connected between said input terminal and ground.

3. The cable equalizing circuit of claim 1, wherein said semiconductor means is a transistor having base, collector and emitter electrodes, said base electrode being connected to said input terminal, said collector electrode being connected to a source of bias voltage, and said emitter electrode being connected to said impedance matching network, whereby said transistor is connected in emitter-follower configuration.

4. The cable equalizing circuit of claim 3, wherein said impedance matching network is comprised of a transformer having primary and secondary windings, said emitter electrode being connected through said primary winding to said first frequency compensating network and said second frequency compensating network being connected to said secondary winding.

5. The cable equalizing circuit of claim 4, wherein said second frequency compensating network is comprised of a first resistor connected between said secondary winding and said output terminal and a first capacitor connected across said resistor.

6. The cable equalizing circuit of claim 5, wherein said first frequency compensating network is comprised of the parallel arrangement of a second resistor and a second capacitor.

7. The cable equalizing circuit of claim 6, further including a third resistor connected between said first frequency compensating network and ground.

8. In the cable equalizing circuit of claim 7, further including impedance matching means connected between said input terminal and ground and having an impedance substantially equal to that of the transmission line connected to said input terminal, whereby reflection losses are reduced.

9. The cable equalizing circuit of claim 1, wherein said semiconductor means is a transistor, said input electrode being the base electrode thereof and said output electrode being the emitter electrode thereof, said transistor further including a collector electrode connected to a source of bias voltage, said impedance matching network and first frequency compensating network being connected in series to ground through a resistor to form a low-impendance load for said transistor, whereby equalization of various lengths of transmission lines may be obtained while maintaining the desired differential phase and gain characteristics of complex waveform signals.

10. The cable equalizing circuit of claim 9, wherein said impedance matching network comprises a transformer and each of said frequency compensating networks comprises the parallel arrangement of a resistor and capacitor.

References Cited

UNITED STATES PATENTS

| | | | |
|---|---|---|---|
| 2,668,883 | 2/1954 | Hurford | 333—28 XR |
| 2,983,875 | 5/1961 | Zechter | 330—32 XR |
| 3,319,079 | 5/1967 | Matsumoto | 333—28 XR |

OTHER REFERENCES

"The Application of Transistors to Military Electronics Equipment," proceedings of symposium held at Yale University, New Haven, Conn. on Sept. 2–3 1953, page 329.

"The A.R.R.L. Antenna Book," The American Radio Relay League, West Hartford, Conn., 1954 p. 68.

HERMAN KARL SAALBACH, Primary Examiner

MARVIN NUSSBAUM, Assistant Examiner

U.S. Cl. X.R.

330—31, 196; 333—28, 32